US012515835B2

(12) United States Patent
Santos Vale

(10) Patent No.: US 12,515,835 B2
(45) Date of Patent: Jan. 6, 2026

(54) AEROSOL-GENERATING ARTICLE COLLATION FORMING WITH INCREASED NUMBER OF HOPPERS

(71) Applicant: Philip Morris Products S.A., Neuchatel (CH)

(72) Inventor: Miguel Lereno Santos Vale, Aarau (CH)

(73) Assignee: Philip Morris Products S.A., Neuchatel (CH)

(*) Notice: Subject to any disclaimer, the term of this patent is extended or adjusted under 35 U.S.C. 154(b) by 0 days.

(21) Appl. No.: 18/853,296

(22) PCT Filed: Apr. 11, 2023

(86) PCT No.: PCT/EP2023/059443
§ 371 (c)(1),
(2) Date: Oct. 1, 2024

(87) PCT Pub. No.: WO2023/198711
PCT Pub. Date: Oct. 19, 2023

(65) Prior Publication Data
US 2025/0214727 A1 Jul. 3, 2025

(30) Foreign Application Priority Data
Apr. 11, 2022 (EP) .................................... 22167558

(51) Int. Cl.
*B65B 19/04* (2006.01)
*B65B 19/10* (2006.01)
(Continued)

(52) U.S. Cl.
CPC .............. *B65B 19/10* (2013.01); *B65B 19/04* (2013.01); *B65B 19/30* (2013.01); *B65B 19/32* (2013.01);
(Continued)

(58) Field of Classification Search
CPC ......... B65B 5/106; B65B 19/04; B65B 19/10; B65B 19/28; B65B 19/30; B65B 19/32;
(Continued)

(56) References Cited

U.S. PATENT DOCUMENTS 3,040,862 A * 6/1962 Schmermund et al. ..................... B65B 57/14 209/552
3,106,282 A 10/1963 Schmermund
(Continued)

FOREIGN PATENT DOCUMENTS

EP 1 626 003 A1 2/2006
EP 3 356 235 B1 11/2019
(Continued)

OTHER PUBLICATIONS

International Search Report issued on Sep. 28, 2023 in PCT/EP2023/059443 filed on Apr. 11, 2023, 4 pages.
(Continued)

*Primary Examiner* — Stephen F. Gerrity
(74) *Attorney, Agent, or Firm* — Oblon, McClelland, Maier & Neustadt, L.L.P.

(57) ABSTRACT

An apparatus for forming a collation of rod-shaped aerosol-generating articles is provided, including: multiple movable pockets, each pocket to house a collation having a number of layers of the articles; a number of hoppers forming a reservoir of the articles, each hopper to provide a respective transfer set of the articles to the collation; and a control system to control relative movement of the respective pocket with respect to the hoppers, the respective pocket to be arranged next to each hopper enabling transfer of the respective transfer set of the articles from the respective hopper to the respective pocket, a cumulative number of the articles in all transfer sets is greater than a number of the articles in the respective collation, and the control system is further to
(Continued)

vertically move the pockets independently of each other relative to the hoppers and/or to move the hoppers independently of each other.

17 Claims, 4 Drawing Sheets

(51) Int. Cl.

| | |
|---|---|
| ***B65B 19/30*** | (2006.01) |
| ***B65B 19/32*** | (2006.01) |
| ***B65B 19/34*** | (2006.01) |
| ***B65B 35/40*** | (2006.01) |
| ***B65B 35/50*** | (2006.01) |
| ***B65B 57/14*** | (2006.01) |

(52) U.S. Cl.
CPC .............. *B65B 19/34* (2013.01); *B65B 35/40* (2013.01); *B65B 35/50* (2013.01); *B65B 57/14* (2013.01); *B65G 2201/0226* (2013.01)

(58) Field of Classification Search
CPC ......... B65B 19/34; B65B 35/40; B65B 35/50; B65B 57/14; B65G 2201/0226
USPC ... 53/444, 447, 55, 494, 534, 540, 148, 149, 53/150, 151, 258
See application file for complete search history.

(56) References Cited

U.S. PATENT DOCUMENTS 3,123,959 A * 3/1964 Carriere et al. ........ B65B 19/34 53/150
3,241,289 A * 3/1966 Molins .................. A24C 5/354 53/151
3,278,077 A * 10/1966 Schmermund .......... B65B 19/04 221/124
4,341,298 A * 7/1982 Dingli ..................... B65B 19/10 53/151
4,503,967 A * 3/1985 Erdmann et al. ....... B65B 19/10 53/151
4,571,918 A 2/1986 Zeitel
5,070,991 A * 12/1991 Hinchcliffe et al. .. B65B 19/105 53/149
5,718,102 A * 2/1998 Draghetti ................ B65B 19/10 53/151
5,732,536 A * 3/1998 Lin et al. ................ B65B 5/106 53/540
5,860,427 A 1/1999 Stivani et al.
6,213,283 B1 4/2001 Bailey et al.
6,385,947 B2 5/2002 Meis
6,425,474 B2 7/2002 Spatafora
6,446,415 B1 * 9/2002 Tale' et al. ............. B65B 19/32 53/444
7,171,796 B2 2/2007 Spirito et al.
9,828,179 B2 11/2017 Prüssmeier et al.
9,882,520 B2 1/2018 Huber et al.
2001/0047806 A1 * 12/2001 Spatafora et al. ...... B65B 19/10 198/418
2001/0052217 A1 * 12/2001 Spatafora ................ B65B 19/10 53/234
2013/0001045 A1 1/2013 Akagi et al.
2019/0055095 A1 * 2/2019 Alig ...................... B65B 35/405
2020/0245673 A1 8/2020 Rutkowski

FOREIGN PATENT DOCUMENTS

KR 10-2101212 B1 4/2020
WO WO 2014/015940 A1 1/2014
WO WO 2020/035786 A1 2/2020
WO WO 2020/035824 A1 2/2020

OTHER PUBLICATIONS

International Preliminary Report on Patentability issued on Aug. 8, 2024 in in PCT/EP2023/059443 filed on Apr. 11, 2023, 26 pages.

* cited by examiner

AEROSOL-GENERATING ARTICLE COLLATION FORMING WITH INCREASED NUMBER OF HOPPERS

The present invention relates to an apparatus for forming a collation of rod-shaped articles and a method for forming a collation of rod-shaped articles.

WO2020035824A1 and WO2020035786A1 disclose a transport assembly for rod-like articles. Rod-like articles are transferred by a drum from a container to a transport section, which is then folded to produce a double-layered collation.

EP3356235B1 discloses an apparatus with a hopper having three sets of channels. A dividing element is used to distribute certain types of articles to specific vanes of the hopper.

EP1626003A1 discloses an apparatus with a hopper for storing rod-shaped articles. The articles are individually pushed into apertures of a mandrel, from where they are pushed into a collation pocket.

WO2014015940A1 discloses an apparatus in which multiple feeders are arranged above multiple hoppers to feed the hoppers with a certain distribution of articles. The articles are then transferred into a pocket to form a collation with one or multiple layers.

U.S. Pat. Nos. 9,882,520B2 and 9,828,179B2 disclose the use of electromagnetic tracks to transport carriers.

There is a need for improving the efficiency and reliability of forming collations of rod-shaped articles, in particular aerosol-generating articles.

According to a first aspect of the invention, there is provided an apparatus for forming a collation of rod-shaped articles, in particular aerosol-generating articles. The apparatus comprises a movable pocket. The pocket is adapted to house a collation of rod-shaped articles having a number of layers. The collation has a number of layers of rod-shaped articles. The collation may have at least two layers of rod-shaped articles. The apparatus further comprises a number of hoppers that form a reservoir of rod-shaped articles. A hopper may be a structure in which rod-shaped articles are gathered and aligned. Each hopper is adapted to provide a respective transfer set of rod-shaped articles to the collation. The apparatus further comprises a control system that is configured to control relative movement of the pocket with respect to the hoppers. The control system may be configured to move the pocket. The control system may be configured to move the hoppers independently from each other. The pocket is adapted to be arranged next to each hopper to enable the transfer of the respective transfer set of rod-shaped articles from the respective hopper to the pocket. The cumulative number of rod-shaped articles in all transfer sets is greater than the number of rod-shaped articles in the collation.

The apparatus may comprise multiple pockets, in particular at least two pockets, in particular at least five pockets, in particular at least ten pockets. The apparatus may comprise multiple pockets that are movable independently of each other, in particular along a track. The pockets may be independently moveable along a track of a transport system. The apparatus may comprise a first pocket and a second pocket. The pockets may be moveable independently of each other, in particular along a track. The control system may be configured to move the pockets independently of each other. The pockets may be moveable independently of each other in a vertical direction. The pockets may be moveable independently of each other in a horizontal direction. The pockets may be moveable independently of each other in a horizontal direction and moveable independently of each other in a vertical direction. Vertical may refer to a direction substantially orthogonal to the extension of the layers of the collation. Horizontal may refer to a direction substantially parallel to the extension of the layers of the collation. The control system may be configured to vertically arrange the pockets independently of each other relative to the hoppers. The control system may be configured to independently adjust the vertical position of each pocket depending on the respective hopper from which the next transfer set is transferred to the respective pocket. The control system may be configured to horizontally arrange the pockets independently of each other relative to the hoppers. The control system may be configured to independently adjust the horizontal position of each pocket depending on the respective hopper from which the next transfer set is transferred to the respective pocket.

The pockets may be grouped into groups of pockets. Pockets within a group of pockets may move together. The group of pockets may be moveable independently of each other. The control system may be configured to move the groups of pockets independently of each other. The features described above regarding the independent movement of the individual pockets may apply to the independent movement of the individual groups of pockets.

The number of rod-shaped articles in each of the respective transfer sets may be smaller than the total number of rod-shaped articles in the collation. The collation may be formed by at least two transfer sets. The total number of rod-shaped articles in the collation may be the number of rod-shaped articles in the collation when the collation is moved away from the number of hoppers. The total number of rod-shaped articles in the collation may be the maximum number of rod-shaped articles that fit into a pocket.

A collation may refer to a completed set of layers of rod-shaped articles. A collation may refer to an arrangement of rod-shaped articles. The collation may later be comprised in a package, in particular a package may be formed around the collation. The collation may comprise multiple layers. The layers may extend predominantly in a first horizontal direction. The extension of a layer may refer to the direction in which the rod-shaped articles are placed adjacent to each other. The rod-shaped articles of a layer may extend predominantly in a second horizontal direction, in particular orthogonal to the first horizontal direction. Two adjacent layers may be stacked on top of each other in a vertical direction. Other orientations are also possible. For example, the rod-shaped articles in the collation may extend predominantly in a vertical direction. The rod-shaped articles may be inclined with respect to the vertical direction or horizontal direction. The rod-shaped articles may be inclined with respect to the vertical direction and horizontal direction. The extension of the layers may be inclined with respect to the vertical direction or horizontal direction. The extension of the layers may be inclined with respect to the vertical direction and horizontal direction.

The layers of the collation may extend predominantly in a direction substantially parallel to the transport direction of the pocket. The transport direction may be the direction in which a carrier on which the pocket is mounted, and thus the pocket, may be transported along a track. The transport direction may change along the track. The orientation of the rod-shaped articles may change along the track. The rod-shaped articles of a layer may extend predominantly orthogonal to the extension of the layers. Two adjacent layers may be stacked on top of each other in a direction substantially orthogonal to the transport direction of the pocket.

The collation may have a particular collation format. Format may be defined by the number of layers in the collation or the number of articles per layer. Format may be defined by the number of layers in the collation and the number of articles per layer. Format may be defined by the offset between adjacent layers. Different layers may contain a different number of articles. With the apparatus according to the present invention, collations of any format may be formed.

A hopper may be understood as an assembly, in particular comprising a group of vanes, to gather and arrange rod-shaped articles in order to transfer them into a pocket. The rod-shaped articles may be fed into the hoppers using a conveyor, in particular a mass flow conveyor, boxes or other transport units. The rod-shaped articles may be fed into the hoppers directly from the machine that produces the rod-shaped articles. A buffering system may be arranged between the machine that produces the rod-shaped articles and one or more of the hoppers.

The hoppers may emerge from a common container or structure, such that the hoppers may be fed together. The common container or structure may act as a buffering system. The hoppers may alternatively be completely separate structures, such that the hoppers may be fed individually. A combination thereof may also be possible. For example, two hoppers may emerge from a common structure and a third hopper may be spaced apart and may constitute an independent structure. The individual hoppers may be fed with articles of the same type or with articles of different types.

While conveying the rod-shaped articles to the hoppers, the rod-shaped articles may be exposed to damage caused by friction between two articles or between an article and parts of the apparatus. Defects, such as deformation of the articles, broken articles, loss of material in the article, wrinkles on the surface of an article or misalignment of articles, may occur. The hoppers may also be prone to jams.

Having more rod-shaped articles in all transfer sets combined than rod-shaped articles in the collation may result in a redundant system.

The number of rod-shaped articles in all transfer sets is greater than the number of rod-shaped articles in the collation. The rod-shaped articles may jam in a first hopper. In case a defect occurs or a first hopper is jammed, the control system may arrange the pocket next to a second hopper. The rod-shaped articles may then be transferred from the transfer set of the second hopper. The first jammed hopper may be cleared in the meantime. Such a configuration may also allow cleaning of the hoppers without interrupting the production. It may also increase the efficiency of the apparatus.

The respective transfer sets may each correspond to one or more layers in the collation. Each hopper may be adapted to transfer one or more layers of rod-shaped articles of the collation.

At least two hoppers may be adapted to provide redundant transfer sets. During normal operation, the redundant transfer set may not be needed to fill the collation. In case of a defect or jam, the redundant transfer set may transfer rod-shaped articles instead of the transfer set, in which the defect or jam occurred.

The number of hoppers may be greater than the number of layers in the collation.

Having more hoppers than the number of layers of the collation may result in a redundant system. In case a defect occurs or a hopper is jammed, the control system may arrange the pocket next to a different hopper. The jammed hopper may be cleared in the meantime. Such a configuration may also allow cleaning of the hoppers without interrupting the production. It may also increase the efficiency of the apparatus.

The collation may comprise one layer and at least two hoppers may be provided. The collation may comprise two layers and at least three hoppers may be provided. The collation may comprise three layers and at least four hoppers may be provided. The collation may comprise four layers and at least five hoppers may be provided.

The number of hoppers may be by at least two greater than the number of layers of the collation. For example, the collation may comprise two layers and the number of hoppers may be at least four. Such a configuration may add an additional layer of redundancy, which may increase the overall efficiency of the apparatus.

The hoppers may comprise one or more vanes. Each vane may be adapted to provide a single rod-shaped article at a predetermined position in the collation. The vanes may align the rod-shaped articles in a single column or single line. The vanes may be separated by a wall. The walls may facilitate aligning the rod-shaped articles. The rod-shaped articles may move into the vanes by means of gravity, air flow or vibration.

The control system may detect a fault condition, for example a jam, in a hopper. The control system may then exclude this hopper from transferring rod-shaped articles from this hopper to the pocket, at least until the hopper is again operational. The fault condition in the hopper may be corrected while the apparatus may continue to operate.

The control system may also detect a fault condition in a vane in one of the hoppers. The control system may then exclude this vane from transferring rod-shaped articles from this vane to the pocket.

Each hopper may be equipped with a plunger. The plunger may be moved into an active position to prevent rod-shaped articles from being fed into the hopper or one or multiple vanes. The plunger may close the hopper or one or multiple vanes. This may facilitate correcting a fault condition in the hopper or a hopper vane. It may also facilitate cleaning of the hopper.

At least one hopper of the number of hoppers and the pocket may be adapted to enable relative movement between at least a part of the hopper and the pocket. The direction of the relative movement may be orthogonal to the extension of the layers of the collation. A component of the movement direction may be orthogonal to the extension of the layers of the collation. In particular, the movement direction may be orthogonal to and along the extension of the layers of the collation. The movement direction may be orthogonal to the track adjacent to the hopper. The layers of the collation may extend substantially parallel to the track adjacent to the hopper. The layers of the collation may extend substantially horizontally. The relative movement between at least a part of the hopper and the pocket may be in a vertical direction.

At least a part of one or more hoppers of the number of hoppers may be moveable substantially orthogonal, in particular vertical, to the extension of the layers of the collation, in particular horizontal. At least a part of one or more hoppers of the number of hoppers may be moveable orthogonal to the track adjacent to the respective hopper.

At least one hopper of the number of hoppers and the pocket may be adapted to enable relative movement between at least a part of the hopper and the pocket in a direction substantially parallel to the extension of the layers of the collation, in particular in a direction substantially horizontal.

At least a part of one or more hoppers of the number of hoppers may be movable in a direction substantially parallel to the extension of the layers of the collation, in particular in a direction substantially horizontal. At least a part of one or more hoppers of the number of hoppers may be movable parallel to the track adjacent to the respective hopper.

Only the pocket may be moveable. Only the hopper may be moveable. Both the hopper and the pocket may be moveable. Only a part of the hopper, in particular the part from which the articles are pushed into the pocket, may be moveable. This may be more energy-efficient compared to moving the whole hopper.

Each hopper may comprise an inserter assembly. The inserter assembly may push one or more rod-shaped articles from the hopper into the pocket.

The inserter assembly may be adapted to push a transfer set of rod-shaped articles from the hopper into the pocket. The inserter assembly may be adapted to push one or more layers of rod-shaped articles from the hopper into the pocket. The inserter assembly may comprise one pusher. The inserter assembly may comprise multiple pushers. The inserter assembly may be adapted to selectively push rod-shaped articles from the hopper into the pocket.

The inserter assembly may be adjustable with respect to the hopper in a direction substantially orthogonal to the extension of the layers of the collation. The inserter assembly may be adjustable with respect to the hopper in a direction substantially vertical. The inserter assembly may be adjustable with respect to the hopper in a direction substantially parallel to the extension of the layers of the collation. The inserter assembly may be adjustable with respect to the hopper in a direction substantially horizontal. The inserter assembly may be adjustable with respect to the hopper in a direction substantially orthogonal to the track adjacent to the respective hopper. The inserter assembly may be adjustable with respect to the hopper in a direction substantially parallel to the track adjacent to the respective hopper. The inserter assembly may be adjustable in multiple directions.

The apparatus may comprise a transport system. The transport system may comprise a track. The track may be a rail or a conveyor. The pocket may be adapted to move along the track. The transport system may transport the pocket from the hoppers to a packer unit. The transport system may comprise an electromagnetic conveyor.

The pockets may be movable independently of each other along the track. Different pockets may be moved with different speeds along the track. Multiple pockets may also be moved synchronously.

One or more pockets may be removably arranged on a carrier. The carrier may be arranged on the track. They carrier may be detachable from the track. The carrier may be movable along the track. The removable pockets may allow cleaning of the pockets while the production is running. This may increase the efficiency of the apparatus. The carriers may comprise a motor.

The transport system may comprise a linear motor.

The transport system may be adapted to move the carriers with individual speeds. The carriers may be movable independently of each other along the track. Different carriers may be moved with different speeds along the track. The number of carriers on the transport system may be adjusted depending on the speed of the carriers. Multiple carriers may be moved synchronously. The speed of the carriers may be changed along the track. The speed of the carriers may be adjusted depending on predefined speed profiles. For example, the carriers may slow down and stop at the feeder unit and at the packer unit and may accelerate in between. The carriers may move at a maximum velocity in the range of 5 meters per second to 30 meters per second, in particular 25 meters per second.

The transport system may comprise at least one junction. The junction may allow moving pockets or carriers to a branch or another track. The branch or the other track may be used for storage, quality control, cleaning or other maintenance. Moving the pockets or carriers off a main production track may allow cleaning or repair of the pockets or carriers while the production is still running.

At least two pockets may have an inner shape different from each other. The pockets of different inner shapes may be suitable to receive a collation of a different format. The use of pockets with different inner shapes may allow a production of different collations simultaneously. Such a configuration may increase production efficiency because the step of switching pockets may not be required.

The branch may allow storing carriers with pockets of formats that are currently not in use. Storing the carriers with pockets on a branch may save time when the production is switched to a different collation format because the pockets may not have to be demounted from the carrier and later again mounted onto the carrier.

The apparatus may comprise a packer unit. The packer unit may be adapted to form a package around the collation of rod-shaped articles. The collation may be transferred to the packer unit, where a package may be created around the collation. Alternatively, the collation may be transferred into an already finished package.

The packer unit may comprise a pusher for transferring the collation from the pocket to the packer unit. The empty pocket may then be transported back to the hoppers.

The transport system may connect the hoppers with the packer units. A collation may be transported from the hoppers to a packer unit by means of the movable pockets.

The apparatus may also comprise two or more packer units. The packer units may be connected with the hoppers by the transport system. The use of multiple packer units may increase the overall production rate of the apparatus.

The packer units may be adapted to transfer collations of the same format to the respective packer unit and may form a package around said collations. A first packer unit may be adapted to transfer a collation of a different format than a second packer unit. A first packer unit may be adapted to transfer a collation of a first format and a second packer unit may be adapted to transfer a collation of a second format, wherein the second format may be different from the first format. Different collation formats may require different packages. Different packer units may be adapted to form different packages. A first packer unit may be adapted to form a package around a collation of a first format, for example a collation of three layers with seven articles each. A second packer unit may be adapted to form a package around a collation of a second format, for example a collation of two layers with ten articles each. This allows the simultaneous production of different collation formats without the need of adjusting the packer units.

The apparatus may comprise an inspection system. The inspection system may be adapted to detect a defective collation or rod-shaped article in a pocket. The inspection system may detect the number of rod-shaped articles of the collation. The inspection system may be adapted to detect visually recognizable defects of the rod-shaped articles of the collation or the collation itself. Transporting the articles on conveyors or feeding the articles into the hoppers may damage the articles, in particular due to friction between different articles or the articles and the apparatus. The inspection system may check the integrity, in particular shape and presence, of the collation on a pocket. The inspection system may check other product quality parameters, in particular loose ends, missing filters or visual defects. The inspection system may be adapted to detect a defective collation or rod-shaped article in a pocket during movement of the pocket. The inspection system may be adapted to detect a defective collation or rod-shaped article in a pocket in a quality control station. The inspection system may be adapted to detect a defective collation or rod-shaped article in a pocket during movement through a quality control station. The inspection system may be configured to detect various defects such as deformation of an article, loss of material in an article, wrinkles on the article surface or misalignments of the articles. The inspection system may be on a main track of the transport system or on a branch of the transport system. The quality control station may be on a main track of the transport system or on a branch of the transport system.

The inspection system may be configured to reject defective collations. The inspection system may be configured to transfer defective collations to a reject station.

The apparatus may comprise a cleaning system. The cleaning system may be adapted to clean an empty pocket. The cleaning system may be adapted to automatically clean an empty pocket. The cleaning system may be on a main track of the transport system or on a branch of the transport system.

Each pocket may comprise an identifier. The identifier may be attached to the pocket, in particular a wall of the pocket, or may be applied, in particular painted, onto the pocket, in particular a wall of the pocket. The identifier may be a visual marker, for example a bar code or QR code, a microchip, for example an RFID tag, or the like.

The apparatus may comprise an identification device. The identification device may be adapted to identify each pocket, in particular based on the identifier on the pocket. The identification device may be a scanner, in particular an RFID scanner or an optical scanner, for example a barcode or QR code scanner. An RFID scanner may also be referred to as an RFID reader.

The identification device may be arranged in or close to the feeder unit, in or close to the packer unit, in or close to the cleaning system, in or close to the inspection system, or along the track The apparatus may comprise multiple identification devices. At least one identification device may be arranged at the feeder unit, in particular at each feeder unit. At least one identification device may be arranged at the packer units, in particular at each packer unit.

The identification device may be used to identify each pocket based on the identifier on the pocket. The identifiers may be used to associate a pocket with the physical property of the pocket. The physical property of the pocket may refer to the type of rod-shaped article, type of collation, the dimension, the number of rod-shaped articles in the collation, the number of layers in the collation or a combination thereof. The identifiers may be used to associate a pocket with the content of the pocket. The identifiers may be used to trace the rod-shaped articles. The identifiers may be used to assure or to check that the pocket is delivered to a desired station. The identifiers may be used to choose a transport path of the pocket to the packer unit. The identifiers may be used to verify that the correct pocket or collation has arrived at the packer unit. The identifiers may be used to verify that the correct pocket and collation has arrived at the packer unit.

The apparatus may result in shorter lead times and may result in a minimal amount of work in progress. This may be beneficial for products that are sensitive to humidity and environmental conditions, in particular products containing hydroscopic materials or gels including volatile substances or flavors. The apparatus may facilitate to change the type of processed articles. The apparatus may enable faster cleaning times.

According to a second aspect of the invention, there is provided a method for forming a collation of rod-shaped articles, in particular aerosol-generating articles. The method comprises the steps of providing a pocket and a feeder unit comprising a set of hoppers, and performing a number of transfer steps to form the collation. Each transfer step comprises arranging the pocket next to a hopper of the set of hoppers and transferring at least one rod-shaped article from said hopper to the pocket. The number of hoppers of the set of hoppers is greater than the number of transfer steps.

The hoppers may be moved independently of each other, in particular in the vertical direction.

The method may comprise providing multiple pockets, wherein the pockets are independently moveable, in particular along a track. The pockets may be movable along a track of a transport system. The collation may be formed in a pocket of the multiple pockets. Each transfer step may comprise arranging said pocket next to a hopper of the set of hoppers and transferring at least one rod-shaped article from said hopper to said pocket.

The method may also form multiple collations of rod-shaped articles, in particular a first collation and a second collation. A first pocket, a second pocket and a feeder unit comprising a set of hoppers may be provided. The first pocket may be moved independently of the second pocket, in particular along a track. The second pocket may be moved independently of the first pocket, in particular along the track. The first and second pocket may be moved independently of each other. The first and second pocket may be moved independently of each other in the vertical direction. The first and second pocket may be moved independently of each other in the horizontal direction. The first and second pocket may be moved independently of each other with respect to the set of hoppers, in particular in a vertical direction with respect to the set of hoppers.

A number of first collation transfer steps may be performed to form the first collation. Each first collation transfer step may comprise arranging the first pocket next to a hopper of the set of hopper and transferring at least one rod-shaped article from said hopper to the first pocket. The number of hoppers in the set of hoppers may be greater than the number of first collation transfer steps.

A number of second collation transfer steps may be performed to form the second collation. Each second collation transfer step may comprise arranging the second pocket next to a hopper of the set of hopper and transferring at least one rod-shaped article from said hopper to the second pocket. The number of hoppers in the set of hoppers may be greater than the number of second collation transfer steps.

The method steps above may be performed in any particular order.

The method may also be used to form a first, second and third collation in a first, second and third pocket, respectively. The first, second and third pocket may be moved independently of each other.

The method may also be used to form a first, second, third and fourth collation in a first, second, third and fourth pocket, respectively. The first, second, third and fourth pocket may be moved independently of each other.

The following description applies to all the methods described above, i.e. a method for forming a single collation, a method for forming a number of collations or a method for forming a first collation and a second collation. The expression collation may also refer to any of the collations specified in the methods for forming a number of collations, i.e. the first collation, the second collation, the third collation or the fourth collation. The expression pocket may also refer to any of the pockets specified in the methods for forming a number of collations, i.e. the first pocket, the second pocket, the third pocket or the fourth pocket. The expression transfer step may also refer to any of the transfer steps specified in the methods for forming a number of collations, i.e. the first collation transfer step, the second collation transfer step, the third collation transfer step or the fourth collation transfer step.

The collation may comprise one or multiple layers of rod-shaped articles. A part of a layer may be transferred during a transfer step. A full layer may be transferred during a transfer step. Multiple layers may be transferred during a transfer step. Any combination of transfer steps in any order may be possible to form a desired collation.

For example, in a first transfer step, two layers may be transferred and in a second transfer step, one layer may be transferred. Alternatively, in the first transfer step, a part of a layer may be transferred, in a second transfer step, a part of a layer may be transferred and in a third transfer step, a full layer may be transferred.

Such a configuration may allow to form a collation comprising different types of articles. For example, one article or one layer in the collation may contain a different flavor or construction.

The number of rod-shaped articles transferred in each of the respective transfer steps may be smaller than the total number of rod-shaped articles in the collation.

Each hopper may comprise an inserter assembly. The inserter assembly may push one or more rod-shaped articles from the hopper into the pocket during a transfer step. The inserter assembly may comprise one or multiple pushers. The inserter assembly may be adapted to selectively push the rod-shaped articles from the hopper into the pocket.

Having more hoppers than the number of transfer steps may result in a redundant method. The rod-shaped articles may cause jams in the hoppers. In case a hopper is jammed, the transfer step may be performed with a different hopper. The jammed hopper may be cleared in the meantime. Such a configuration may also allow cleaning of the hoppers without interrupting the production. It may also increase the efficiency of the apparatus.

The method may comprise one transfer step and at least two hoppers may be provided. The method may comprise two transfer steps and at least three hoppers may be provided. The method may comprise three transfer steps and at least four hoppers may be provided. The method may comprise four transfer steps and at least five hoppers may be provided.

The number of hoppers may be by at least two greater than the number of transfer steps. For example, the number of transfer steps may be two and the number of hoppers may be at least four. Such a configuration may add an additional layer of redundancy, which may increase the overall efficiency of the method.

Each transfer step may be performed with a different hopper of the set of hoppers. In each transfer step, at least one layer of rod-shaped articles may be transferred from the hopper to the pocket.

Each pocket may comprise an identifier. The identifier may be attached to the pocket, in particular a wall of the pocket, or may be applied, in particular painted, onto the pocket, in particular a wall of the pocket. The identifier may be a visual marker, for example a bar code or QR code, a microchip, for example an RFID tag, or the like.

The method may comprise one or more steps of identifying the pocket based on the identifier on the pocket. An identification device may be used to identify the pocket. The identification device may be adapted to identify the pocket, in particular based on the identifier on the pocket. The identification device may be a scanner, in particular an RFID scanner or an optical scanner, for example a barcode or QR code scanner.

The method may further comprise the step of associating physical properties of the pocket with the identifier on the pocket. The physical property of the pocket may refer to the type of article, the type of collation, the dimension, the number of rod-shaped articles in the collation, the number of layers in the collation or a combination thereof. The identifiers may be used to associate a pocket with the content of the pocket The method may further comprise the step of transporting the pocket to a packer unit, wherein the packer unit may be selected based on the identifier on the pocket. The identifiers may be used to choose a transport path of the pocket to the packer unit. The identifiers may be used to trace the rod-shaped articles. The identifiers may be used to assure or to check that the pocket is delivered to a desired station The method may further comprise the step of verifying that the correct pocket was transported to the packer unit based on the identifier on the pocket.

According to a third aspect of the invention, there is provided a method for forming a collation of rod-shaped articles, in particular aerosol-generating articles. The method comprises the steps of arranging a pocket, in particular a first pocket, subsequently next to a first set of hoppers and transferring at least one rod-shaped article from each hopper of the first set of hoppers to the pocket, in particular the first pocket, to form a first collation. Then, a pocket, in particular a second pocket, is arranged subsequently next to a second set of hoppers and at least one rod-shaped article is transferred from each hopper of the second set of hoppers to the pocket, in particular the second pocket, to form a second collation. The second set of hoppers comprises at least one hopper which is not comprised in the first set of hoppers.

For this particular aspect of the invention, the expressions first pocket and second pocket may refer to the same pocket but at different points in time. For example, the first collation may be formed in a pocket, referred to as the first pocket. After the first collation has been transferred out of the pocket, a second collation may be formed in the pocket, now referred to as the second pocket.

Each set of hoppers may comprise at least two or three hoppers. The first set of hoppers may comprise at least two hoppers and the second set of hoppers may comprise at least three hoppers. The second set of hoppers may comprise at least three hoppers and the first set of hoppers may comprise at least two hoppers. The first set of hoppers may comprise two hoppers and the second set of hoppers may comprise three hoppers. The second set of hoppers may comprise two hoppers and the first set of hoppers may comprise three hoppers. The first set of hoppers and the second set of hoppers may share one common hopper. The first set of hoppers and the second set of hoppers may share two common hoppers. The first set of hoppers and the second set of hoppers may share three common hoppers.

A first collation is formed in a first pocket by hoppers of a first set of hoppers, for instance a first hopper, a second hopper and a third hopper. A jam may happen in one of the hoppers of the first set of hoppers, for example the third hopper, after the first collation has been formed. Then, another hopper, for example a fourth hopper, which is not comprises in the first set of hoppers, may replace the jammed hopper and may define a second set of hoppers together with the remaining hoppers of the first set of hoppers. A second collation is then formed in a second pocket by the hoppers of the second set of hoppers, for example the first hopper, the second hopper and the fourth hopper. The first pocket and the second pocket may be the same pocket.

The first set of hoppers may comprise a first hopper and a second hopper. The second set of hoppers may comprise the first hopper and a third hopper.

The first set of hoppers may comprise a first hopper, a second hopper and a third hopper. The second set of hoppers may comprise the first hopper, the second hopper and a fourth hopper.

According to a fourth aspect of the invention, there is provided an apparatus for producing packages of rod-shaped articles, in particular aerosol-generating articles. The apparatus comprises a transport system with one or more movable pockets. The apparatus further comprises at least one feeder unit. The feeder unit is adapted to feed a collation of rod-shaped articles to the pocket. The apparatus further comprises two or more packer units. Each packer unit is adapted to form a package around the collation of rod-shaped articles.

Such a configuration may result in shorter lead times and may result in a minimal amount of work in progress. This may be beneficial for products that are sensitive to humidity and environmental condition, in particular products containing hydroscopic materials or gels including volatile substances or flavors. The apparatus may allow to change brand production more frequently. The apparatus may enable faster cleaning times and may reduce the risk of contamination between two different brands that are produced in succession.

The feeder unit may comprise one or more hoppers forming a reservoir of rod-shaped articles. A hopper may be understood as a container, in particular comprising a group of vanes, to gather and arrange rod-shaped articles in order to transfer them into a pocket. The rod-shaped articles may be fed into the hoppers using a conveyor, in particular a mass flow conveyor, boxes or other transport units. The rod-shaped articles may be fed into the hoppers directly from the machine that produces the rod-shaped articles. A buffering system may be arranged between the machine that produces the rod-shaped articles and the hoppers.

The apparatus may comprise multiple feeder units. A first feeder unit may be adapted to feed a pocket with a first collation. A second feeder unit may be adapted to feed a pocket with a second collation. The first collation may be different from the second collation.

The first collation may have a different format than the second collation. The first collation may comprise rod-shaped articles of a different type than the second collation. This may enable the production of multiple different products at the same time without stopping the production.

The transport system may comprise a track and may connect the feeder unit with the packer units. The transport system may connect the feeder units with the packer units. The transport system may comprise an electromagnetic conveyor.

Multiple products may be produced, fed to a desired feeder unit and transported to a desired packer unit. Multiple packer units may be connected to one feeder unit. Multiple feeder units may be connected to one packer unit. Each feeder unit may be connected to each packer unit.

The pocket may be movable independently of other pockets along the track between the feeder unit or feeder units and the packer units. Different pockets may be moved with different speeds along the track. Multiple pockets may also me moved synchronously. The speed of the pockets may be adjusted depending on predefined speed profiles. For example, the pockets may slow down and stop at the feeder unit and at the packer unit and may accelerate in between.

One or more pockets may be removably arranged on a carrier. The carrier may be arranged on the track. The carrier may be detachable from the track. The carrier may be movable along the track. The removable pockets may allow cleaning of the pockets while the production is running. This may increase the efficiency of the apparatus.

The carrier may be automatically attachable to the track. The carrier may be automatically detachable from the track. The pocket or pockets may be automatically attachable to the carrier. The pocket or pockets may be automatically detachable from the carrier. The transport system may be configured to automatically attach and detach the carrier to and from the track. The transport system may be configured to automatically attach and detach the pocket or pockets to and from the carrier.

The transport system may comprise a linear motor.

At least two pockets may comprise an inner shape different from each other. The pockets of different inner shapes may be suitable to receive a collation of a different format. The use of pockets with different inner shapes may allow the production of different collations simultaneously. Such a configuration may increase production efficiency because the step of switching pockets may not be required.

The transport system may comprise multiple carriers. The transport system may be adapted to move the carriers with individual speeds. The carriers may be movable independently of each other along the track. Different carriers may be moved with different speeds along the track. The number of carriers on the transport system may be adjusted depending on the speed of the carriers. The speed of the carriers may be adjusted depending on predefined speed profiles. For example, the carriers may slow down and stop at the feeder unit and at the packer unit and may accelerate in between. Multiple carriers may also be moved synchronously. The carriers may move at a maximum velocity in the range of 5 meters per second to 30 meters per second, in particular 25 meters per second.

The transport system may comprise at least one junction. The junction may allow moving pockets or carriers to a branch or another track. The branch or the other track may be used for storage, quality control or maintenance. Moving the pockets or carriers off a main production track may allow cleaning or repair of the pockets or carriers while the production is still running.

The transport system may comprise one or more branches. Each branch may be associated with at least one packer unit. There may also be more branches then packer units. A branch may be associated with a cleaning system. A branch may be associated with an inspection system.

The packer unit may comprise a pusher for transferring the collation from the pocket to the packer unit. The collation may be transferred to the packer unit, where a package may be formed around the collation. Alternatively, the collation may be transferred into an already finished package. The empty pocket may be transported back to the feeder units.

The transport system may connect the feeder unit with the packer units in order to transport a collation from the feeder unit to a packer unit by means of a movable pocket.

The packer units may be adapted to form packages around collations of the same format. A first packer unit may be adapted to form a package around a collation of a different format than a second packer unit. For example, a first packer unit may be adapted to form a package around a collation of a first format, for example a collation of three layers with seven articles each. A second packer unit may be adapted to form a package around a collation of a second format, for example a collation of two layers with ten articles each.

The apparatus may comprise an inspection system. The inspection system may be adapted to detect a defective collation or rod-shaped article in a pocket. The inspection system may detect the number of rod-shaped articles of the collation. The inspection system may be adapted to detect visually recognizable defects of the rod-shaped articles of the collation or the collation itself. Transporting the articles on conveyors or feeding the articles into the hoppers may damage the articles, in particular due to friction between different articles or the articles and the apparatus. The inspection system may check the integrity, in particular shape and presence, of the collation on a pocket. The inspection system may check other product quality parameters, in particular loose ends, missing filters or visual defects. The inspection system may be adapted to detect a defective collation or rod-shaped article in a pocket during movement of the pocket. The inspection system may be adapted to detect a defective collation or rod-shaped article in a pocket in a quality control station. The inspection system may be adapted to detect a defective collation or rod-shaped article in a pocket during movement through a quality control station.

The inspection system may be configured to reject defective collations. The inspection system may be configured to transfer defective collations to a reject station. The inspection system may be configured to detect various defects such as deformation of an article, loss of material in an article, wrinkles on the article surface or misalignments of the articles.

The apparatus may comprise a cleaning system. The cleaning system may be adapted to clean an empty pocket.

The apparatus may comprise a central system. The central system may manage the flow of carriers and pockets. The central system may monitor the transport system and its different branches. The central system may be adapted to route a pocket from a feeder unit to a desired packer unit.

Each pocket may comprise an identifier. The identifier may be attached to the pocket, in particular a wall of the pocket, or may be applied, in particular painted, onto the pocket, in particular a wall of the pocket. The identifier may be a visual marker, for example a bar code or QR code, a microchip, for example an RFID tag, or the like.

The apparatus may comprise an identification device. The identification device may be adapted to identify each pocket, in particular based on the identifier on the pocket. The identification device may be a scanner, in particular an RFID scanner or an optical scanner, for example a barcode or QR code scanner.

The identification device may be arranged in or close to the feeder unit, in or close to the packer unit, in or close to the cleaning system, in or close to the inspection system, or along the track The apparatus may comprise multiple identification devices. At least one identification device may be arranged at the feeder unit, in particular at each feeder unit. At least one identification device may be arranged at the packer units, in particular at each packer unit.

The identification device may be used to identify each pocket based on the identifier on the pocket. The identifiers may be used to associate a pocket with the physical property of the pocket. The physical property of the pocket may refer to the type of article, the type of collation, the dimension, the number of rod-shaped articles in the collation, the number of layers in the collation or a combination thereof. The identifiers may be used to associate a pocket with the content of the pocket. The identifiers may be used to trace the rod-shaped articles. The identifiers may be used to assure or to check that the pocket is delivered to a desired station. The identifiers may be used to choose a transport path of the pocket to the packer unit. The identifiers may be used to verify that the correct pocket or collation has arrived at the packer unit. The identifiers may be used to verify that the correct pocket and collation has arrived at the packer unit.

According to a fifth aspect of the invention, there is provided a method for producing packages of rod-shaped articles, in particular aerosol-generating articles. The method comprises the step of transferring at least one rod-shaped article to an individually movable pocket of a transport system to form a collation. The pocket with the collation is then moved to a packer unit of two or more packer units. Then, a package is formed around the collation by the packer unit. The pocket may be movable independently of other pockets in the transport system.

Moving the pocket may depend on the format of the collation. The packer unit to which the pocket is moved may be chosen depending on the format of the collation.

Moving the pocket may depend on the type of rod-shaped article in the collation. The packer unit to which the pocket is moved may be chosen depending on the type of rod-shaped article in the collation.

The package may correspond to the format of the collation.

Each pocket may comprise an identifier. The identifier may be attached to the pocket, in particular a wall of the pocket, or may be sprayed or painted onto the pocket, in particular a wall of the pocket. The identifier may be a visual marker, for example a bar code or QR code, a microchip, for example an RFID tag, or the like.

The method may comprise one or more steps of identifying the pocket based on the identifier on the pocket. An identification device may be used to identify the pocket. The identification device may be adapted to identify the pocket, in particular based on the identifier on the pocket. The identification device may be a scanner, in particular an RFID scanner or an optical scanner, for example a barcode or QR code scanner.

The method may further comprise the step of associating physical properties of the pocket with the identifier on the pocket. The physical property of the pocket may refer to the type of article, the type of collation, the dimension, the number of rod-shaped articles in the collation, the number of layers in the collation or a combination thereof. The identifiers may be used to associate a pocket with the content of the pocket The method may further comprise the step of transporting the pocket to a packer unit, wherein the packer unit is selected based on the identifier on the pocket. The identifiers may be used to choose a transport path of the pocket to the packer unit. The identifiers may be used to trace the rod-shaped articles. The identifiers may be used to assure or to check that the pocket is delivered to a desired station The method may further comprise the step verifying that the correct pocket was transported to the packer unit based on the identifier on the pocket.

The apparatus according to the first or fourth aspect of the invention may be used using method steps according to the method of the second, third or fifth aspect of the invention. The method according to the second, third or fifth aspect of the invention may be performed with an apparatus according to the first or fourth aspect of the invention.

The invention is defined in the claims. However, below there is provided a non-exhaustive list of non-limiting examples. Any one or more of the features of these examples may be combined with any one or more features of another example, embodiment, or aspect described herein.

Example Ex1: Apparatus for forming a collation of rod-shaped articles, in particular aerosol-generating articles, comprising a movable pocket, the pocket being adapted to house a collation having a number of layers of rod-shaped articles, a number of hoppers forming a reservoir of rod-shaped articles, wherein each hopper is adapted to provide a respective transfer set of rod-shaped articles to the collation, a control system configured to control relative movement of the pocket with respect to the hoppers, wherein the pocket is adapted to be arranged next to each hopper enabling transfer of the respective transfer set of rod-shaped articles from the respective hopper to the pocket, wherein the cumulative number of rod-shaped articles in all transfer sets is greater than the number of rod-shaped articles in the collation.

Example Ex2: Apparatus for forming a collation of rod-shaped articles, in particular aerosol-generating articles, according to example Ex1, wherein the respective transfer sets each correspond to one or more layers in the collation.

Example Ex3: Apparatus for forming a collation of rod-shaped articles, in particular aerosol-generating articles, according to example Ex1 or Ex2, Wherein at least two hoppers are adapted to provide redundant transfer sets.

Example Ex4: Apparatus for forming a collation of rod-shaped articles, in particular aerosol-generating articles, according to any one of the previous examples, wherein the number of hoppers is greater than the number of layers in the collation.

Example Ex5: Apparatus for forming a collation of rod-shaped articles, in particular aerosol-generating articles, according to any one of the previous examples, wherein the collation comprises two layers and at least three hoppers are provided.

Example Ex6: Apparatus for forming a collation of rod-shaped articles, in particular aerosol-generating articles, according to any one of the previous examples, wherein the collation comprises three layers and at least four hoppers are provided.

Example Ex7: Apparatus for forming a collation of rod-shaped articles, in particular aerosol-generating articles, according to any one of the previous examples, wherein the collation comprises four layers and at least five hoppers are provided.

Example Ex8: Apparatus for forming a collation of rod-shaped articles, in particular aerosol-generating articles, according to any one of the previous examples, wherein the number of hoppers is by at least two greater than the number of layers of the collation.

Example Ex9: Apparatus for forming a collation of rod-shaped articles, in particular aerosol-generating articles, according to any one of the previous examples, wherein the hopper comprises one or more vanes, each vane being adapted to provide a single rod-shaped article at a predetermined position in the collation.

Example Ex10: Apparatus for forming a collation of rod-shaped articles, in particular aerosol-generating articles, according to any one of the previous examples, wherein when the control system detects a fault condition in one of the hoppers, the control system excludes this hopper from transferring rod-shaped articles from this hopper to the pocket.

Example Ex11: Apparatus for forming a collation of rod-shaped articles, in particular aerosol-generating articles, according to any one of the previous examples, wherein when the control system detects a fault condition in one of the hopper vanes, the control system excludes this hopper vane from transferring rod-shaped articles from this vane to the pocket.

Example Ex12: Apparatus for forming a collation of rod-shaped articles, in particular aerosol-generating articles, according to any one of the previous examples, wherein at least one hopper of the number of hoppers and the pocket are adapted to enable relative movement between at least a part of the hopper and the pocket, wherein the movement is orthogonal to the extension of the layers of the collation.

Example Ex13: Apparatus for forming a collation of rod-shaped articles, in particular aerosol-generating articles, according to any one of the previous examples, wherein at least a part of one or more hoppers of the number of hoppers is movable in a direction substantially orthogonal to the extension of the layers of the collation.

Example Ex14: Apparatus for forming a collation of rod-shaped articles, in particular aerosol-generating articles, according to any one of the previous examples, wherein at least one hopper of the number of hoppers and the pocket are adapted to enable relative movement between at least a part of the hopper and the pocket in a direction substantially parallel to the extension of the layers of the collation.

Example Ex15: Apparatus for forming a collation of rod-shaped articles, in particular aerosol-generating articles, according to any one of the previous examples, wherein at least a part of one or more hoppers of the number of hoppers is movable in a direction substantially parallel to the extension of the layers of the collation.

Example Ex16: Apparatus for forming a collation of rod-shaped articles, in particular aerosol-generating articles, according to any one of the previous examples, wherein each hopper comprises an inserter assembly for pushing one or more rod-shaped articles from the hopper into the pocket.

Example Ex17: Apparatus for forming a collation of rod-shaped articles, in particular aerosol-generating articles, according to example Ex16, wherein the inserter assembly is adapted to push a transfer set of rod-shaped articles from the hopper into the pocket.

Example Ex18: Apparatus for forming a collation of rod-shaped articles, in particular aerosol-generating articles, according to example Ex16 or Ex17, wherein the inserter assembly is adapted to push one or more layers of rod-shaped articles from the hopper into the pocket.

Example Ex19: Apparatus for forming a collation of rod-shaped articles, in particular aerosol-generating articles, according to any one of examples Ex16 to Ex18, wherein the inserter assembly comprises one pusher.

Example Ex20: Apparatus for forming a collation of rod-shaped articles, in particular aerosol-generating articles, according to any one of examples Ex16 to Ex19, wherein the inserter assembly comprises multiple pushers adapted to selectively push rod-shaped articles from the hopper into the pocket.

Example Ex21: Apparatus for forming a collation of rod-shaped articles, in particular aerosol-generating articles, according to any one of examples Ex16 to Ex20, wherein the inserter assembly is adjustable with respect to the hopper in a direction substantially orthogonal to the extension of the layers of the collation.

Example Ex22: Apparatus for forming a collation of rod-shaped articles, in particular aerosol-generating articles, according to any one of examples Ex16 to Ex21, wherein the inserter assembly is adjustable with respect to the hopper in a direction substantially parallel to the extension of the layers of the collation.

Example Ex23: Apparatus for forming a collation of rod-shaped articles, in particular aerosol-generating articles, according to any one of the previous examples, further comprising a transport system with a track, wherein the pocket is adapted to move along the track.

Example Ex24: Apparatus for forming a collation of rod-shaped articles, in particular aerosol-generating articles, according to example Ex23, wherein multiple pockets are movable independently of each other along the track.

Example Ex25: Apparatus for forming a collation of rod-shaped articles, in particular aerosol-generating articles, according to example Ex23 or Ex24, wherein one or more pockets are removably arranged on a carrier, wherein the carrier is arranged on and movable along the track.

Example Ex26: Apparatus for forming a collation of rod-shaped articles, in particular aerosol-generating articles, according to any one of examples Ex23 to Ex25, wherein the transport system comprises a linear motor.

Example Ex27: Apparatus for forming a collation of rod-shaped articles, in particular aerosol-generating articles, according to any one of examples Ex23 to Ex26, wherein the transport system is adapted to move the carriers with individual speeds.

Example Ex28: Apparatus for forming a collation of rod-shaped articles, in particular aerosol-generating articles according to any one of examples Ex23 to Ex27, wherein the transport system comprises at least one junction.

Example Ex29: Apparatus for forming a collation of rod-shaped articles, in particular aerosol-generating articles, according to any one of examples Ex23 to Ex28, wherein the junction allows moving pockets to a branch or another track, in particular for storage, quality control, cleaning or other maintenance.

Example Ex30: Apparatus for forming a collation of rod-shaped articles, in particular aerosol-generating articles, according to any one of the previous examples, wherein at least two pockets have an inner shape different from each other, suitable to receive a collation of a different format.

Example Ex31: Apparatus for forming a collation of rod-shaped articles, in particular aerosol-generating articles, according to any one of the previous examples, comprising a packer unit, wherein the packer unit is adapted to form a package around the collation of rod-shaped articles.

Example Ex32: Apparatus for forming a collation of rod-shaped articles, in particular aerosol-generating articles, according to example Ex31, wherein the packer unit comprises a pusher for transferring the collation from the pocket to the packer unit.

Example Ex33: Apparatus for forming a collation of rod-shaped articles, in particular aerosol-generating articles, according to example Ex31 or Ex32, wherein the transport system connects the hoppers with the packer unit in order to transport a collation from the hoppers to a packer unit by means of the movable pocket.

Example Ex34: Apparatus for forming a collation of rod-shaped articles, in particular aerosol-generating articles, according to any one of examples Ex31 to Ex33, comprising two or more packer units being connected with the hoppers by the transport system.

Example Ex35: Apparatus for forming a collation of rod-shaped articles, in particular aerosol-generating articles, according to example Ex34, wherein the packer units are adapted to transfer collations of the same format to the packer unit and form a package around said collations.

Example Ex36: Apparatus for forming a collation of rod-shaped articles, in particular aerosol-generating articles, according to example Ex34 or Ex35, wherein a first packer unit is adapted to transfer a collation of a first format and a second packer unit may be adapted to transfer a collation of a second format, wherein the second format is different from the first format.

Example Ex37: Apparatus for forming a collation of rod-shaped articles, in particular aerosol-generating articles, according to any one of the previous examples, comprising an inspection system adapted to detect a defective collation or rod-shaped article in a pocket.

Example Ex38: Apparatus for forming a collation of rod-shaped articles, in particular aerosol-generating articles, according to example Ex37, wherein the inspection system is adapted to detect the number of rod-shaped articles of the collation.

Example Ex39: Apparatus for forming a collation of rod-shaped articles, in particular aerosol-generating articles, according to example Ex37 or Ex38, wherein the inspection system is adapted to detect visually recognizable defects of the rod-shaped articles of the collation.

Example Ex40: Apparatus for forming a collation of rod-shaped articles, in particular aerosol-generating articles, according to any one of examples Ex37 to Ex39, wherein the inspection system is adapted to detect a defective collation or rod-shaped article in a pocket during movement of the pocket.

Example Ex41: Apparatus for forming a collation of rod-shaped articles, in particular aerosol-generating articles, according to any one of the previous examples, wherein the apparatus comprises a cleaning system adapted to clean an empty pocket.

Example Ex42: Apparatus for forming a collation of rod-shaped articles, in particular aerosol-generating articles, according to any one of the previous examples, wherein the apparatus comprises an identification device, wherein the identification device is adapted to identify the pocket, in particular based on an identifier on the pocket.

Example Ex43: Apparatus for forming a collation of rod-shaped articles, in particular aerosol-generating articles, according to example Ex42, wherein the identification device is a scanner, in particular an optical scanner or an RFID scanner.

Example Ex44: Apparatus for forming a collation of rod-shaped articles, in particular aerosol-generating articles, according to any one of the previous examples, wherein the apparatus comprises multiple identification devices.

Example Ex45: Apparatus for forming a collation of rod-shaped articles, in particular aerosol-generating articles, according to any one of examples Ex42 to Ex44, wherein at least one identification device is arranged at the feeder units, in particular at each feeder unit, and at least one identification device is arranged at the packer units, in particular at each packer unit.

Example Ex46: Method for forming a collation of rod-shaped articles, in particular aerosol-generating articles, comprising the steps of: providing a pocket and a feeder unit comprising a set of hoppers, and performing a number of transfer steps to form the collation, wherein each transfer step comprises arranging the pocket next to a hopper of the set of hoppers and transferring at least one rod-shaped article from said hopper to the pocket, wherein the number of hoppers in the set of hoppers is greater than the number of transfer steps.

Example Ex47: Method for forming a collation of rod-shaped articles, in particular aerosol-generating articles, according to example Ex46, wherein each transfer step is performed with a different hopper of the set of hoppers.

Example Ex48: Method for forming a collation of rod-shaped articles, in particular aerosol-generating articles, according to example Ex46 or Ex47, wherein in each transfer step, at least one layer of rod-shaped articles is transferred from the hopper to the pocket.

Example Ex49: Method for forming a collation of rod-shaped articles, in particular aerosol-generating articles, according to any one of examples Ex46 to Ex48, wherein the number of transfer steps is three and the number of hoppers is at least four.

Example Ex50: Method for forming a collation of rod-shaped articles, in particular aerosol-generating articles, according to any one of examples Ex46 to Ex49, wherein the number of transfer steps is four and the number of hoppers is at least five.

Example Ex51: Method for forming a collation of rod-shaped articles, in particular aerosol-generating articles, according to any one of examples Ex46 to Ex50, wherein the number of hoppers is by at least two greater than the number of transfer steps.

Example Ex52: Method for forming a collation of rod-shaped articles, in particular aerosol-generating articles, according to any one of examples Ex46 to Ex51, wherein the method for forming a collation further comprises one or more steps of identifying the pocket based on an identifier on the pocket.

Example Ex53: Method for forming a collation of rod-shaped articles, in particular aerosol-generating articles, according to example Ex52, wherein the method for forming a collation further comprises the step of associating physical properties of the pocket with the identifier on the pocket.

Example Ex54: Method for forming a collation of rod-shaped articles, in particular aerosol-generating articles, according to example Ex52 or Ex53, wherein the method for forming a collation further comprises the step of transporting the pocket to a packer unit, wherein the packer unit is selected based on the identifier on the pocket.

Example Ex55: Method for forming a collation of rod-shaped articles, in particular aerosol-generating articles, according to example Ex54, wherein the method for forming a collation further comprises the step verifying that the correct pocket was transported to the packer unit based on the identifier on the pocket.

Example Ex56: Method for forming a collation of rod-shaped articles, in particular aerosol-generating articles, comprising the steps of arranging a first pocket subsequently next to a first set of hoppers and transferring at least one rod-shaped article from each hopper of the first set of hoppers to the first pocket to form a first collation, and arranging a second pocket subsequently next to a second set of hoppers and transferring at least one rod-shaped article from each hopper of the second set of hoppers to the second pocket to form a second collation, wherein the second set of hoppers comprises at least one hopper which is not comprised in the first set of hoppers.

Example Ex57: Method for forming a collation of rod-shaped articles, in particular aerosol-generating articles, according to example Ex56, wherein the first set of hoppers comprises a first hopper and a second hopper, and wherein the second set of hoppers comprises the first hopper, and a third hopper.

Example Ex58: Method for forming a collation of rod-shaped articles, in particular aerosol-generating articles, according to example Ex56, wherein the first set of hoppers consists of a first hopper, a second hopper and a third hopper, and wherein the second set of hoppers consists of the first hopper, the second hopper and a fourth hopper.

Example Ex59: Apparatus for producing packages of rod-shaped articles, in particular aerosol-generating articles, comprising a transport system with one or more movable pockets, at least one feeder unit adapted to feed a collation of rod-shaped articles to the pocket, two or more packer units, each adapted to form a package around the collation of rod-shaped articles.

Example Ex60: Apparatus for producing packages of rod-shaped articles, in particular aerosol-generating articles, according to example Ex59, wherein the feeder unit comprises one or more hoppers forming a reservoir of rod-shaped articles.

Example Ex61: Apparatus for producing packages of rod-shaped articles, in particular aerosol-generating articles, according to example Ex59 or Ex60, comprising two or more feeder units.

Example Ex62: Apparatus for producing packages of rod-shaped articles, in particular aerosol-generating articles, according to any one of examples Ex59 to Ex61, wherein a first feeder unit is adapted to feed a pocket with a first collation, wherein a second feeder unit is adapted to feed a pocket with a second collation, wherein the first collation is different from the second collation.

Example Ex63: Apparatus for producing packages of rod-shaped articles, in particular aerosol-generating articles, according to example Ex62, wherein the first collation has a different format than the second collation.

Example Ex64: Apparatus for producing packages of rod-shaped articles, in particular aerosol-generating articles, according to example Ex62 or Ex63, wherein the first collation comprises rod-shaped articles of a different type than the second collation.

Example Ex65: Apparatus for producing packages of rod-shaped articles, in particular aerosol-generating articles, according to any one of examples Ex59 to Ex64, wherein the transport system comprises a track and connects the feeder unit with the packer units.

Example Ex66: Apparatus for producing packages of rod-shaped articles, in particular aerosol-generating articles, according to example Ex65, wherein the pocket is movable independently of other pockets along the track between the feeder unit and the packer units.

Example Ex67: Apparatus for producing packages of rod-shaped articles, in particular aerosol-generating articles, according to example Ex65 or Ex66, wherein one or more pockets are removably arranged on a carrier, wherein the carrier is arranged on and movable along the track.

Example Ex68: Apparatus for producing packages of rod-shaped articles, in particular aerosol-generating articles, according to any one of examples Ex59 to Ex67, wherein the transport system comprises a linear motor.

Example Ex69: Apparatus for producing packages of rod-shaped articles, in particular aerosol-generating articles, according to any one of examples Ex59 to Ex68, Wherein at least two pockets are suitable for receiving collations of different formats.

Example Ex70: Apparatus for producing packages of rod-shaped articles, in particular aerosol-generating articles, according to any one of examples Ex59 to Ex69, wherein the transport system is adapted to move the carriers with individual speeds.

Example Ex71: Apparatus for producing packages of rod-shaped articles, in particular aerosol-generating articles, according to any one of examples Ex59 to Ex70, wherein the transport system comprises at least one junction.

Example Ex72: Apparatus for producing packages of rod-shaped articles, in particular aerosol-generating articles, according to example Ex71, wherein the junction allows moving pockets to a branch or another track, in particular for storage, quality control, cleaning or other maintenance.

Example Ex73: Apparatus for producing packages of rod-shaped articles, in particular aerosol-generating articles, according to any one of examples Ex59 to Ex72, wherein the transport system comprises one or more branches, each branch associated with at least one packer unit.

Example Ex74: Apparatus for producing packages of rod-shaped articles, in particular aerosol-generating articles, according to any one of examples Ex59 to Ex73, wherein the packer unit comprises a pusher for transferring the collation from the pocket to the packer unit.

Example Ex75: Apparatus for producing packages of rod-shaped articles, in particular aerosol-generating articles, according to any one of examples Ex59 to Ex74, wherein the transport system connects the feeder unit with the packer units in order to transport a collation from the feeder unit to a packer unit by means of the movable pocket.

Example Ex76: Apparatus for producing packages of rod-shaped articles, in particular aerosol-generating articles, according to any one of examples Ex59 to Ex75, wherein the packer units are adapted to form packages around collations of the same format.

Example Ex77: Apparatus for producing packages of rod-shaped articles, in particular aerosol-generating articles, according to any one of examples Ex59 to Ex76, wherein a first packer unit is adapted to form a package around a collation of a different format than a second packer unit.

Example Ex78: Apparatus for producing packages of rod-shaped articles, in particular aerosol-generating articles, according to any one of examples Ex59 to Ex77, comprising an inspection system adapted to detect a defective collation or rod-shaped article in a pocket.

Example Ex79: Apparatus for producing packages of rod-shaped articles, in particular aerosol-generating articles, according to example Ex78, wherein the inspection system is adapted to detect the number of rod-shaped articles of the collation.

Example Ex80: Apparatus for producing packages of rod-shaped articles, in particular aerosol-generating articles, according to example Ex78 or Ex79, wherein the inspection system is adapted to detect visually recognizable defects of the rod-shaped articles of the collation.

Example Ex81: Apparatus for producing packages of rod-shaped articles, in particular aerosol-generating articles, according to any one of examples Ex78 to Ex80, wherein the inspection system is adapted to detect a defective collation or rod-shaped article in a pocket in a quality control station or during movement of the pocket.

Example Ex82: Apparatus for producing packages of rod-shaped articles, in particular aerosol-generating articles, according to any one of examples Ex59 to Ex81, further comprising a cleaning system adapted to clean an empty pocket.

Example Ex83: Apparatus for producing packages of rod-shaped articles, in particular aerosol-generating articles, according to any one of examples Ex59 to Ex82, wherein the apparatus comprises an identification device, wherein the identification device is adapted to identify the pocket, in particular based on an identifier on the pocket.

Example Ex84: Apparatus for producing packages of rod-shaped articles, in particular aerosol-generating articles, according to example Ex83, wherein the identification device is a scanner, in particular an optical scanner or an RFID scanner.

Example Ex85: Apparatus for producing packages of rod-shaped articles, in particular aerosol-generating articles, according to example Ex83 or Ex84, wherein the apparatus comprises multiple identification devices.

Example Ex86: Apparatus for producing packages of rod-shaped articles, in particular aerosol-generating articles, according to any one of examples Ex83 to Ex85, wherein at least one identification device is arranged at the feeder units, in particular at each feeder unit, and at least one identification device is arranged at the packer units, in particular at each packer unit.

Example Ex87: Method for producing packages of rod-shaped articles, in particular aerosol-generating articles, the method comprising the steps of transferring at least one rod-shaped article from a feeder unit to an individually movable pocket of a transport system to form a collation, moving the pocket with the collation to a packer unit of two or more packer units, forming a package around the collation by the packer unit.

Example Ex88: Method for producing packages of rod-shaped articles, in particular aerosol-generating articles, according to example Ex87, wherein moving the pocket depends on the format of the collation.

Example Ex89: Method for producing packages of rod-shaped articles, in particular aerosol-generating articles, according to example Ex87 or Ex88, wherein moving the pocket depends on the type of rod-shaped articles in the collation.

Example Ex90: Method for producing packages of rod-shaped articles, in particular aerosol-generating articles, according to any one of examples Ex87 to Ex89, wherein the package corresponds to the format of the collation.

Example Ex91: Method for producing packages of rod-shaped articles, in particular aerosol-generating articles, according to any one of examples Ex87 to Ex90, wherein the method for producing packages further comprises one or more steps of identifying the pocket based on an identifier on the pocket.

Example Ex92: Method for producing packages of rod-shaped articles, in particular aerosol-generating articles, according to example Ex91, wherein the method for producing packages further comprises the step of associating physical properties of the pocket with the identifier on the pocket.

Example Ex93: Method for producing packages of rod-shaped articles, in particular aerosol-generating articles, according to example Ex91 or Ex92, wherein the method for producing packages further comprises the step of transporting the pocket to the packer unit, wherein the packer unit is selected based on the identifier on the pocket.

Example Ex94: Method for producing packages of rod-shaped articles, in particular aerosol-generating articles, according to example Ex93, wherein the method for producing packages further comprises the step verifying that the correct pocket was transported to the packer unit based on the identifier on the pocket.

Example Ex95: Apparatus for forming a collation of rod-shaped articles, in particular aerosol-generating articles, according to any one of examples Ex1 to Ex45, comprising multiple pockets that are movable independently of each other, in particular along a track.

Example Ex96: Apparatus for forming a collation of rod-shaped articles, in particular aerosol-generating articles, according to any one of examples Ex1 to Ex45 or Ex95, wherein the apparatus comprises multiple pockets, each pocket being adapted to house a collation having a number of layers of rod-shaped articles, wherein the control system is configured to move the pockets independently of each other, in particular along a track.

Example Ex97: Method for forming a collation of rod-shaped articles, in particular aerosol-generating articles, according to any one of examples Ex46 to Ex55, the method comprises the step of providing multiple pockets, the pockets being moveable independently of each other, wherein the collation is formed in a pocket of the multiple pockets.

Example Ex98: Method for forming a collation of rod-shaped articles, in particular aerosol-generating articles, according to any one of examples Ex46 to Ex55, wherein the pocket is a first pocket, the number of transfer sets is a number of first collation transfer steps, and the collation is a first collation, wherein the method further comprises the steps of providing a second pocket and performing a number of second collation transfer steps to form a second collation, wherein each second collation transfer step comprises arranging the second pocket next to a hopper of the set of hoppers and transferring at least one rod-shaped article from said hopper to the second pocket, wherein the number of hoppers in the set of hoppers is greater than the number of second collation transfer steps, wherein the first pocket and the second pocket are moved independently of each other. The examples will now be further described with reference to the figures.

Figure 1:
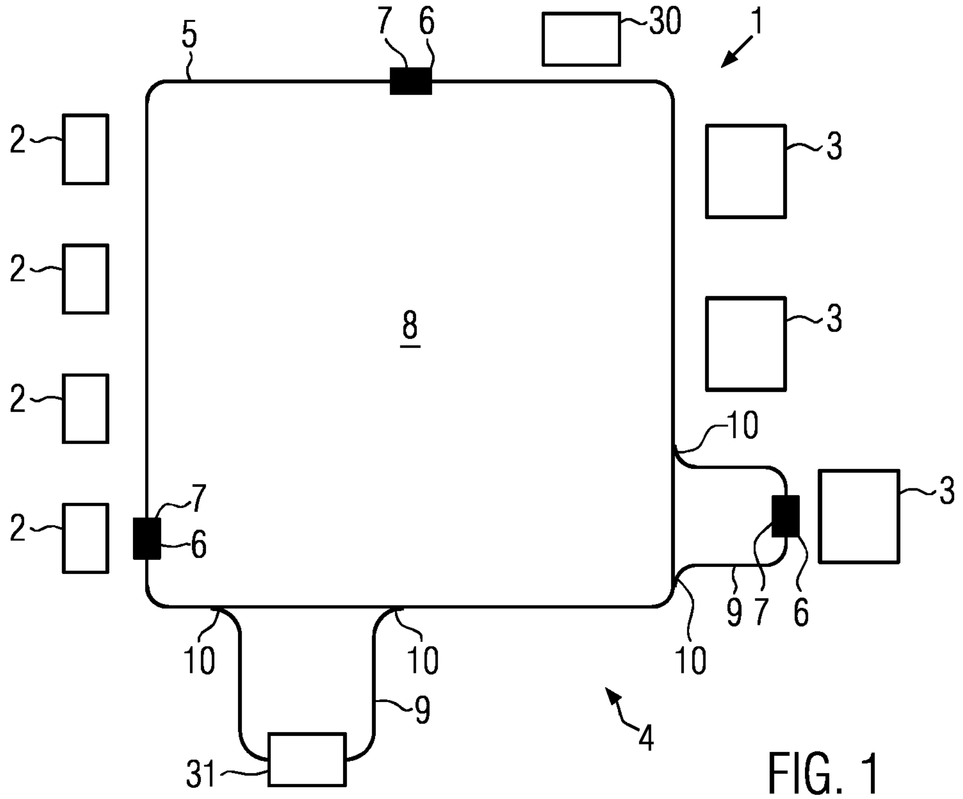
FIG. 1 shows a schematic top view of an apparatus according to an embodiment of the invention.

An apparatus 1 according to an embodiment of the present invention is shown in FIG. 1. The apparatus 1 comprises multiple feeder units 2 and multiple packer units 3. The feeder units 2 are connected to the packer units 3 via a transport system 4. The transport system 4 comprises a track 5. Carriers 6 with pockets 7 move along the track 5. The transport system 4 comprises a main loop 8 and several branches 9. Junctions 10 connect the branches 9 with the main loop 8. The pockets 7 are fed with rod-shaped articles 11 at the feeder units 2 and then transported on carriers 6 to the packer units 3. An inspection system 30 is arranged along the track 5 between the feeder units 2 and the packer units 3. A cleaning system 31 is arranged on a branch 9 between the packer units 3 and the feeder units 2.

Figure 2:
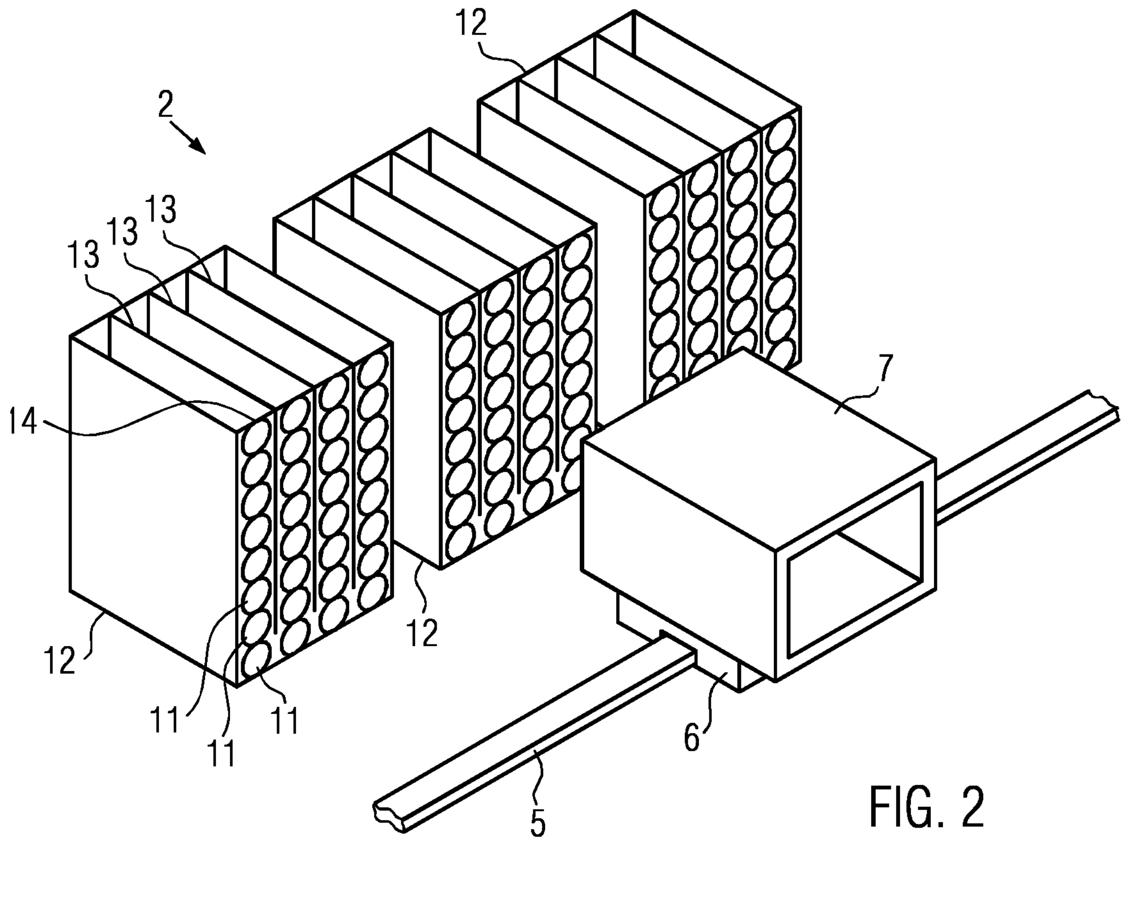
FIG. 2 shows a perspective view of a feeder unit and a part of the transport system of FIG. 1.

FIG. 2 shows a feeder unit 2 according to an embodiment of the present invention. The feeder unit 2 comprises three hoppers 12. Each hopper 12 holds a plurality of rod-shaped articles 11. Each hopper 12 comprises hopper walls 13 to form multiple vanes 14. The vanes 14 help to arrange the rod-shaped articles 11 into columns. FIG. 2 also shows that a carrier 6 with a pocket 7 is moved adjacent to a hopper 12. Rod-shaped articles 11 located at the bottom of the hopper 12 are then pushed into the pocket 7 by an inserter assembly 15 to form a collation 17 of rod-shaped articles 11.

Figure 3:
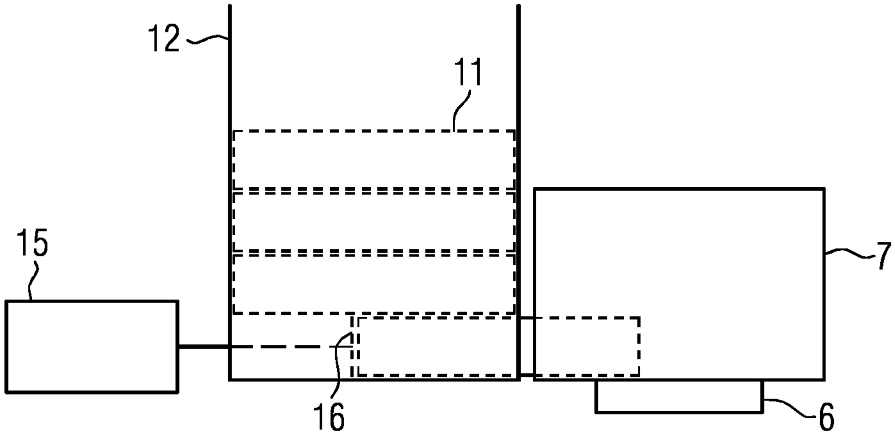
FIG. 3 shows a side view of FIG. 2.

The inserter assembly 15 and how the rod-shaped articles 11 are pushed into the pocket 7 are shown in FIG. 3. The inserter assembly 15 enters through an opening at the back of the hopper 12 and selectively transfers rod-shaped articles 11 into the pocket 7. The inserter assembly 15 can have only one pusher 16 as shown in FIG. 3, but may also have multiple pushers 16.

Figure 4:
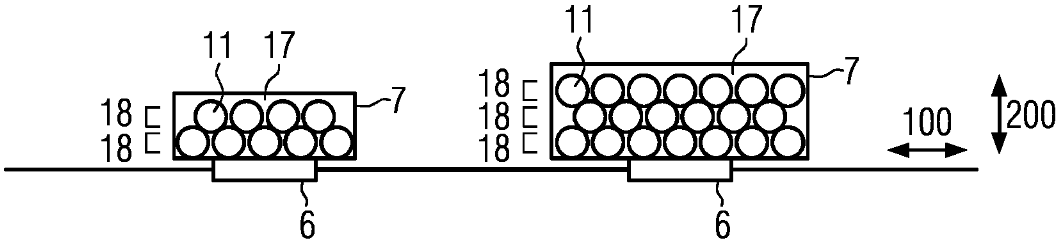
FIG. 4 shows a front view of two different collations in two different pockets according to an embodiment of the invention.

FIG. 4 shows two collations 17 of rod-shaped articles 11 in pockets 7. The collations 17 in FIG. 4 have different formats. The collation 17 in the pocket 7 on the left side has two layers 18 of rod-shaped articles 11 and the collation 17 in the pocket 7 on the right side has three layers 18 of rod-shaped articles 11. The number of rod-shaped articles 11 per layer 18 varies between the two collations 17 but also between different layers 18 of the same collation 17.

In this embodiment, the layers 18 extend predominantly in a horizontal direction 100 and two layers 18 are stacked on top of each other in a vertical direction 200.

FIG. 4 also shows that the pockets 7 have different shapes to house collations 17 of different formats.

Figure 5:
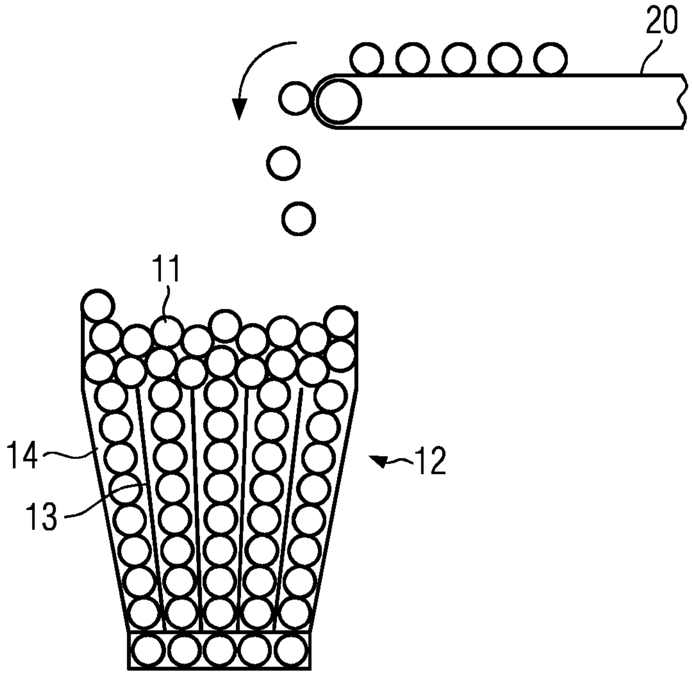
FIG. 5 shows a front view of a hopper according to an embodiment of the invention.

The feeder unit 2 comprises multiple individual hoppers 12. FIG. 5 shows an individual hopper 12 that is separated from other hoppers 12. In an upper part of the hopper 12, the rod-shaped articles 11 are arbitrarily arranged. As the rod-shaped articles 11 progress towards the lower part of the hopper 12, the rod-shaped articles 11 are separated by the hopper walls 13 and arranged into columns in the vanes 14.

Figure 6:
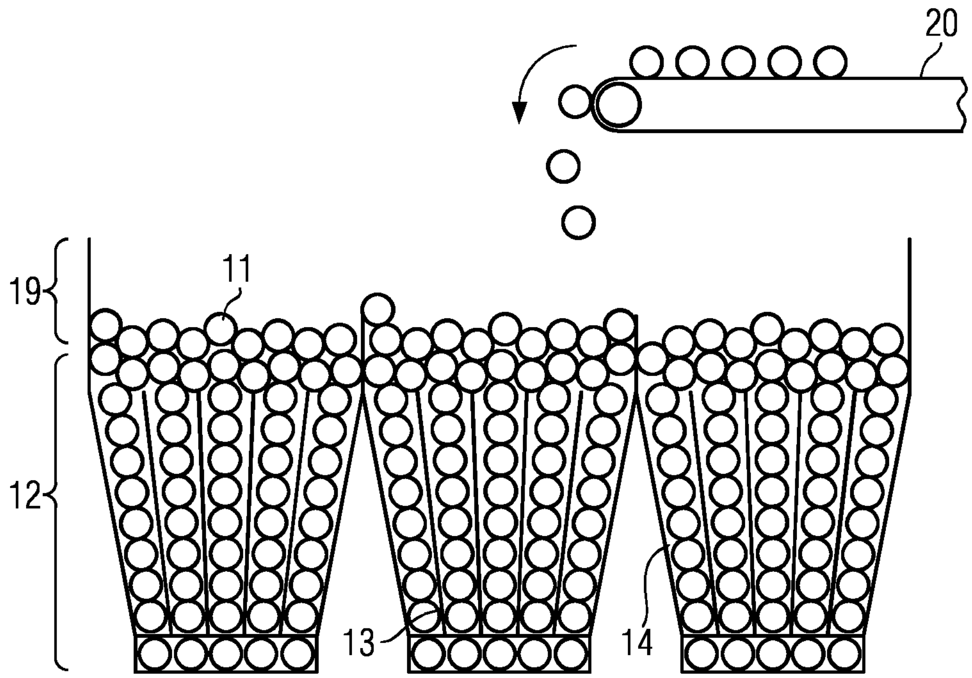
FIG. 6 shows a front view of three combined hoppers according to an embodiment of the invention.

In another embodiment, the feeder unit 2 comprises hoppers 12 that emerge from a common container 19. FIG. 6 shows three hoppers 12 that emerge from a common container 19. Each hopper 12 shown in FIGS. 5 and 6 comprises four additional hopper walls 13 to form five vanes 14. The hoppers 12 are fed with rod-shaped articles 11 by a conveyor 20.

Figure 7:
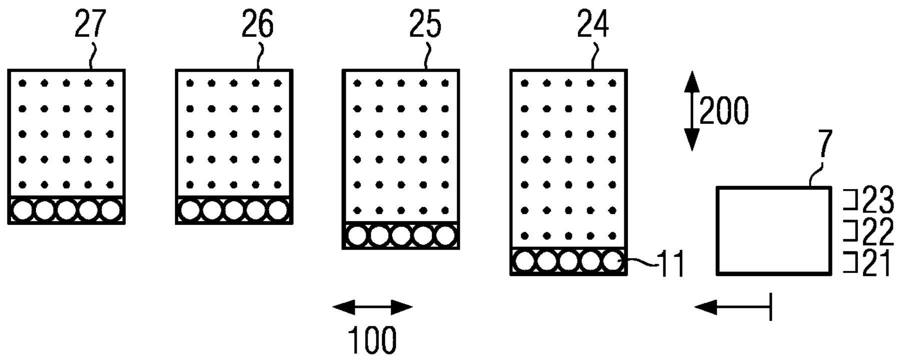
FIG. 7 shows a front view of a schematic representation of how the rod-shaped articles are transferred from the feeder unit to the pocket according to an embodiment of the invention.

FIG. 7 demonstrates how the rod-shaped articles 11 are transferred from the hoppers 12 into the pocket 7. In this embodiment, a collation 17 with three layers 18, namely a first layer 21, a second layer 22 and a third layer 23, is formed. The feeder unit 2 comprises a first hopper 24, a second hopper 25, a third hopper 26 and a fourth hopper 27. In this embodiment, each layer 18 of the collation 17 corresponds to a transfer set. The positions of the hoppers 24, 25, 26, 27 are adjustable in the vertical direction 200. The pocket 7 moves along the horizontal direction 100 to align with the first hopper 24. After the first layer 21 of rod-shaped articles 11 is transferred from the first hopper 24 into the pocket 7, the pocket 7 moves to the second hopper 25 to receive the second layer 22 of rod-shaped articles 11. The pocket 7 is then moved to the third hopper 26 to receive the third layer 23 of rod-shaped articles 11. In this example, the fourth hopper 27 is redundant.

Figure 8:
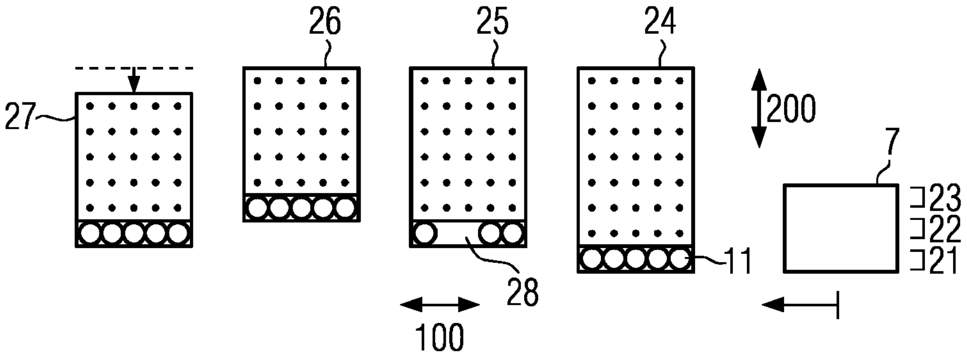
FIG. 8 shows a front view of the schematic representation of FIG. 7 in a different scenario.

FIG. 8 shows the same embodiment as FIG. 7. However, in this example, a jam in the second hopper 25 led to a defect 28 in the arrangement of rod shaped articles 11. The fourth hopper 27 moves downwards to replace the second hopper 25. The pocket 7 moves to the first hopper 24 to receive the first layer 21 of rod-shaped articles 11. Then the pocket 7 moves to the fourth hopper 27 to receive the second layer 22 of rod shaped articles 11. The pocket 7 is then moved to the third hopper 26 to receive the third layer 23 if rod-shaped articles 11. The jammed second hopper 25 can be cleared in the meantime without the need of stopping the feeder unit 2. It is also possible that the third hopper 26 moves downward to replace the second hopper 25 and the fourth hopper 27 replaces the third hopper 26.

Figure 9:
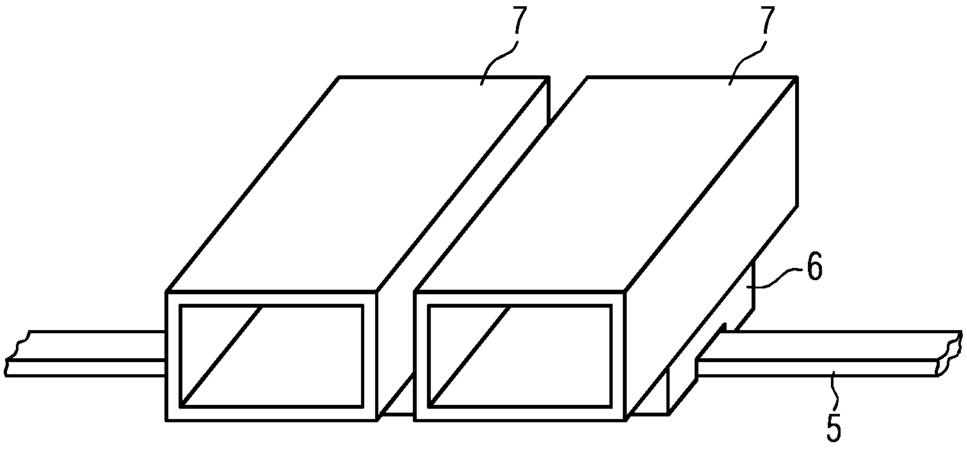
FIG. 9 shows a perspective view of a carrier mounting two pockets according to an embodiment of the invention.

FIG. 9 shows a carrier 6 on a track 5. Two pockets 7 are attached to the carrier 6. The pockets 7 are also detachable from the carrier 6.

Figure 10:
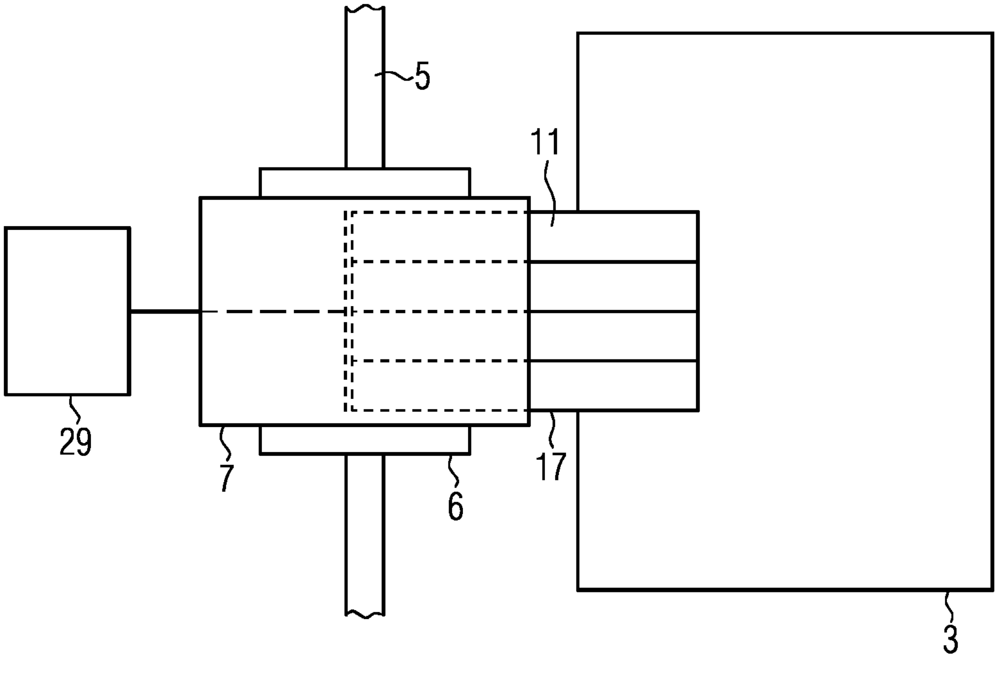
FIG. 10 shows a top view of a packer unit according to an embodiment of the invention.

FIG. 10 shows a packer unit 3 according to an embodiment of the present invention. A carrier 6 is moved along the track 5 to place a pocket 7 adjacent to the packer unit 3. The packer unit 3 comprises a packer unit pusher 29 that transfers the collation 17 of rod-shaped articles 11 from the pocket 7 onto the packer unit 3. The packer unit 3 then forms a package around the collation 17 of rod-shaped articles 11.

The invention claimed is:

1. An apparatus for forming a collation of rod-shaped aerosol-generating articles, the apparatus comprising:

multiple movable pockets, each pocket being configured to house a collation having a number of layers of the rod-shaped aerosol-generating articles;

a number of hoppers forming a reservoir of the rod-shaped aerosol-generating articles, wherein each hopper is configured to provide a respective transfer set of the rod-shaped aerosol-generating articles to the collation; and a control system configured to control relative movement of the respective pocket with respect to the hoppers, wherein the respective pocket is configured to be arranged next to each hopper enabling transfer of the respective transfer set of the rod-shaped aerosol-generating articles from the respective hopper to the respective pocket, wherein a cumulative number of the rod-shaped aerosol-generating articles in all transfer sets is greater than a number of the rod-shaped aerosol-generating articles in the respective collation, and wherein the control system is further configured to vertically move the pockets independently of each other relative to the hoppers and/or is further configured to move the hoppers independently of each other.

2. The apparatus for forming a collation of rod-shaped aerosol-generating articles according to claim 1, wherein the number of hoppers is greater than the number of layers in the collation.

3. The apparatus for forming a collation of rod-shaped aerosol-generating articles according to claim 1, wherein when the control system detects a fault condition in one of the hoppers, the control system excludes this hopper from transferring the rod-shaped aerosol-generating articles from this hopper to the pockets.

4. The apparatus for forming a collation of rod-shaped aerosol-generating articles according to claim 1, wherein at least one hopper of the number of hoppers and the pockets are configured to enable relative movement between at least a part of the hopper and the pockets, and wherein the movement is orthogonal to an extension of the layers of the collation.

5. The apparatus for forming a collation of rod-shaped aerosol-generating articles according to claim 1, wherein at least a part of one or more hoppers of the number of hoppers is movable in a direction substantially orthogonal to an extension of the layers of the collation.

6. The apparatus for forming a collation of rod-shaped aerosol-generating articles according to claim 1, wherein each hopper comprises an inserter assembly for pushing one or more rod-shaped aerosol-generating articles from the hopper into the pockets.

7. The apparatus for forming a collation of rod-shaped aerosol-generating articles according to claim 1, further comprising a transport system with a track, wherein the pockets are configured to move along the track.

8. The apparatus for forming a collation of rod-shaped aerosol-generating articles according to claim 7, wherein the multiple pockets are movable independently of each other along the track.

9. The apparatus for forming a collation of rod-shaped aerosol-generating articles according to claim 7, wherein one or more pockets are removably arranged on a carrier, and wherein the carrier is arranged on and movable along the track.

10. The apparatus for forming a collation of rod-shaped aerosol-generating articles according to claim 1, wherein at least two pockets have an inner shape different from each other, suitable to receive a collation of a different format.

11. The apparatus for forming a collation of rod-shaped aerosol-generating articles according to claim 1, further comprising a packer unit configured to form a package around the collation of rod-shaped aerosol-generating articles.

12. The apparatus for forming a collation of rod-shaped aerosol-generating articles according to claim 1, further comprising an inspection system configured to detect a defective collation or rod-shaped aerosol-generating article in a pocket.

13. The apparatus for forming a collation of rod-shaped aerosol-generating articles according to claim 1, further comprising an identification device configured to identify the pockets based on an identifier on the pockets.

14. A method for forming a collation of rod-shaped aerosol-generating articles, the method comprising the steps of:

providing multiple pockets and a feeder unit comprising a set of hoppers; and performing a number of transfer steps to form the collation in a pocket of the multiple pockets, wherein each transfer step of the number of transfer steps comprises arranging the pocket next to a hopper of the set of hoppers and transferring at least one rod-shaped aerosol-generating article from the hopper to the pocket, wherein a number of hoppers in the set of hoppers is greater than the number of transfer steps, and wherein a control system is configured to vertically move the pockets independently of each other relative to the hoppers and/or is configured to move the hoppers independently of each other.

15. The method for forming a collation of rod-shaped aerosol-generating articles according to claim 14, wherein said each transfer step of the number of transfer steps is performed with a different hopper of the set of hoppers.

16. A method for forming a collation of rod-shaped aerosol-generating articles, the method comprising the steps of:

arranging a first pocket subsequently next to a first set of hoppers;

transferring at least one rod-shaped aerosol-generating article from each hopper of the first set of hoppers to the first pocket to form a first collation;

arranging a second pocket subsequently next to a second set of hoppers; and transferring the at least one rod-shaped aerosol-generating article from said each hopper of the second set of hoppers to the second pocket to form a second collation, wherein the second set of hoppers comprises at least one hopper that is not comprised in the first set of hoppers, and wherein the first set of hoppers and the second set of hoppers share one, two, or three common hoppers.

17. The method according to claim 16, wherein the first set of hoppers comprises at least two hoppers and the second set of hoppers comprises at least two hoppers.

* * * * *